Sept. 7, 1965  W. P. LAWSON  3,204,979
VEHICLE SUSPENSION DEVICE
Filed June 28, 1962  4 Sheets-Sheet 1

INVENTOR.
WILLIAM P. LAWSON
BY
Mann, Brown & McWilliams
ATTORNEYS

Sept. 7, 1965   W. P. LAWSON   3,204,979
VEHICLE SUSPENSION DEVICE

Filed June 28, 1962   4 Sheets-Sheet 2

*INVENTOR.*
WILLIAM P. LAWSON
BY
Mann, Brown & McWilliams
ATTORNEYS

Sept. 7, 1965 W. P. LAWSON 3,204,979
VEHICLE SUSPENSION DEVICE
Filed June 28, 1962 4 Sheets-Sheet 3
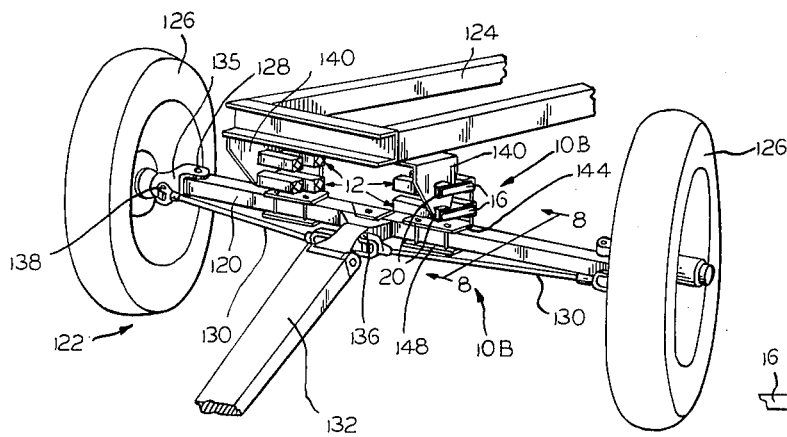
FIG.7
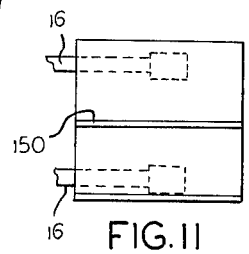
FIG.11
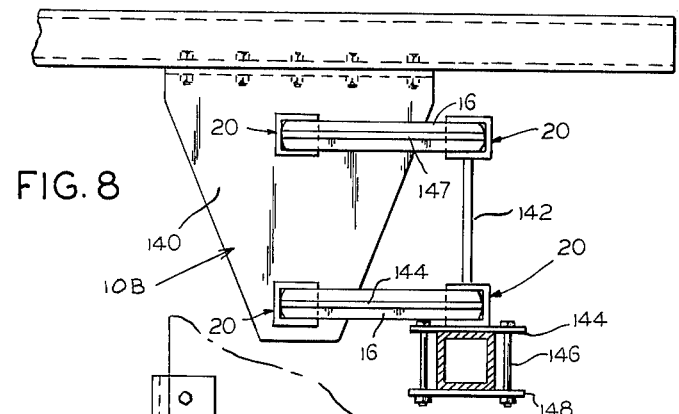
FIG.8
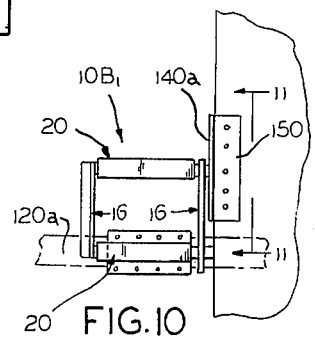
FIG.10
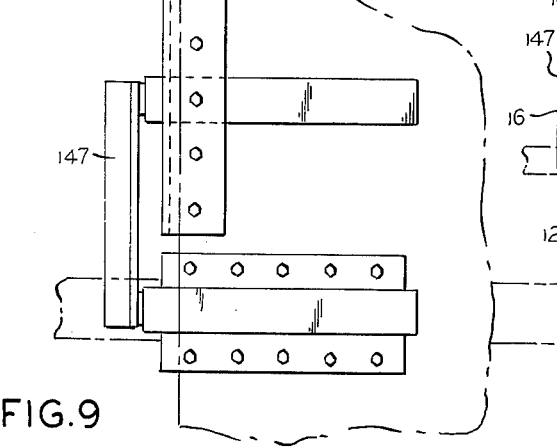
FIG.9
FIG.12
INVENTOR.
WILLIAM P. LAWSON
BY
Mann, Brown・McWilliams
ATTORNEYS INVENTOR.
WILLIAM P. LAWSON
BY
Mann, Brown & McWilliams
ATTORNEYS United States Patent Office 3,204,979
Patented Sept. 7, 1965

3,204,979
VEHICLE SUSPENSION DEVICE
William P. Lawson, Box 33, Boswell, Ind.
Filed June 28, 1962, Ser. No. 205,949
1 Claim. (Cl. 280—103)

My invention relates to a vehicle suspension device, and more particularly, to a suspension arrangement in the form of an articulated grouping of resilient joint devices.

Elastic or flexible joints of the resilient type shown in Neidhart Patent 2,712,742 have some important advantages over ordinary spring arrangements, in that the Neidhart joint has unlimited fatigue life, a variable spring rate, and requires no lubrication.

A principal object of this invention is to provide a vehicle suspension device employing elastic joints of this type in an articulated cluster or group that is adapted to provide a number of different vehicle suspension arrangements.

Another important object of this invention is to provide a vehicle suspension device that is arranged to make available for vehicle suspensions the advantages of the aforementioned type of joint.

Other objects of the invention are to provide a vehicle wheel suspension of the type indicated which may be applied directly to vehicle bodies, to provide a vehicle wheel suspension of the type indicated for turning front wheels, to provide a vehicle suspension of the type indicated for mounting vehicle bodies on through axles, and to provide a vehicle suspension arrangement or device that is economical of manufacture, convenient in use and readily adapted for a wide variety of applications.

Other objects, uses and advantages will be obvious or become apparent from a consideration of the following detailed description and the application drawings.

In the drawings:

FIGURE 7 is a fragmental diagrammatic perspective view showing the front end of a trailer chassis as suspended in accordance with this invention on a through axle of a turning front end trailer arrangement;

FIGURE 8 is a diagrammatic elevational view taken along line 8—8 of FIGURE 7;

FIGURE 9 is a diagrammatic fragmental plan view of the suspension device on the left hand side of the trailer arrangement shown in FIGURE 7;

FIGURE 10 is a view similar to that of FIGURE 9, but illustrating a modified form of this particular arrangement;

FIGURE 11 is a diagrammatic elevational view substantially along line 11—11 of FIGURE 10;

FIGURE 12 is a view similar to that of FIGURE 9, but showing both sides of the vehicle frame suspension, and illustrating an additional modified arrangement;

Figure 1:
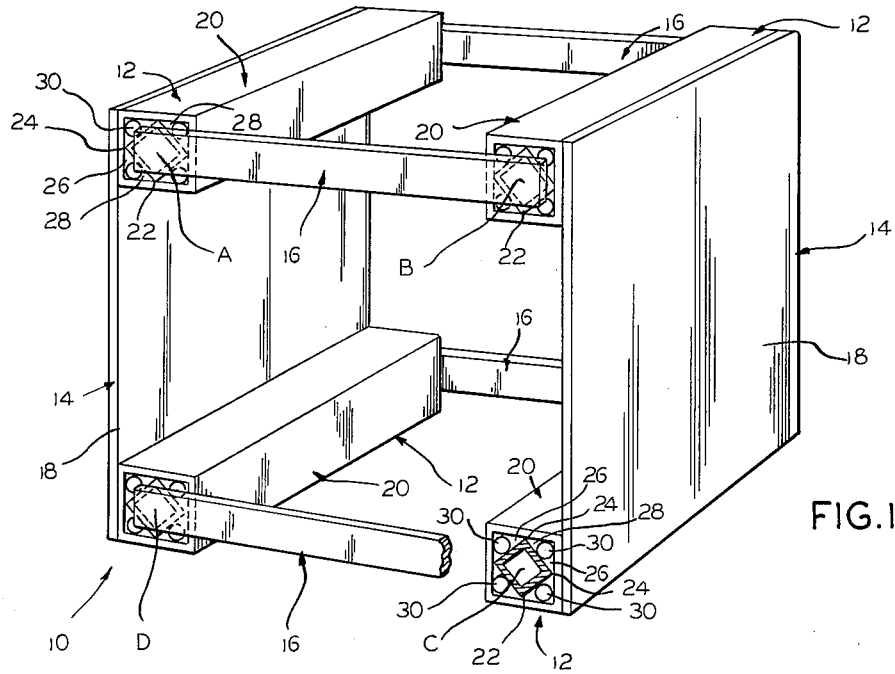
FIGURE 1 is a diagrammatic perspective view illustrating the basic vehicle suspension arrangement or group that is contemplated by this invention.

However, it should be understood that the specific structures shown in the drawing illustrations are provided primarily to comply with the requirements of 35 U.S.C. 112, and that the invention may take other specific forms, as will be obvious to those skilled in the art.

*General description*

Figure 2:
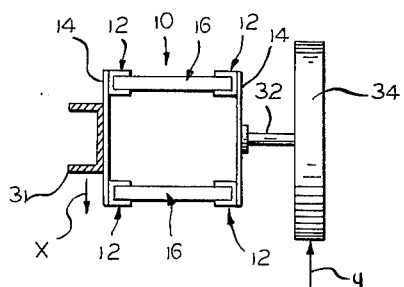
FIGURE 2 is a diagrammatic elevational view showing the suspension device of FIGURE 1 in association with a wheel in a vehicle frame member, and is provided to bring out one of the critical aspects of this invention.

Referring now to FIGURES 1 and 2, reference numeral 10 generally indicates the basic vehicle suspension arrangement contemplated by this invention, which comprises a plurality of resiliently flexible joint devices 12 connected together in operative relation by brace structures 14 and links or torque arms 16.

In accordance with this invention, elastic joints of the type disclosed in said Neidhart patent are articulated together in group form to provide a vehicle suspension assembly arrangement that eliminates the need for expensive bearing structures, lubrication, conventional spring arrangements and the like. As illustrated in FIGURE 1, four of the resiliently elastic joint devices 12 are contemplated, and on either side of the device, two of the joint devices 12 are rigidly connected together by brace or bracket member structures 14, each of which may take the form of a plate structure 18 or its equivalent which in practice is arranged to serve as a bracket device for connecting the opposite sides of the assembly to the vehicle wheel and frame, respectively. The plates 18 and the devices 12 on either side of the device are pivotally connected together by the links 16, which in effect form a parallel linkage between the respective plate structures.

The individual joint devices 12 each comprises a polygonal housing 20 having received therein a polygonal core member 22 with the respective housings and core members having the same number of sides, and with the core members being oriented with respect to the respective housing members, in the unstressed condition of the device 10, such that the apexes 24 of the core members are positioned adjacent the inner faces 26 of the respective housing members. In this position, the members 20 and 22 define pockets 28 in each of which is received an elongate resiliently elastic rod or rod-like element 30.

As described in said Neidhart patent, if one of the members 20 or 22 of the individual devices 12 is turned with respect to the other member, the relative rotation between the two is resisted by the elastic rods 30 that in effect form cushioning elements.

In accordance with this invention, the core members 22 at like ends of the brace or bracket member structures 14 are connected together by the respective pairs of links 16 and it is contemplated that the links 16 will be fixed to the indicated core members, as by welding or the like. The housings 20 associated with the respective brace structures 14 are fixed thereto, as by welding or the like.

Further in accordance with this invention, it is contemplated that when the device 10 is mounted in its operative position, it will be so mounted that the links 16 will be substantially horizontally disposed when the load is static, with the idea being that the respective vehicle components that are to be resiliently connected to each other will be respectively connected to the individual brace structures 14. Rod elements 30 may be sufficiently prestressed and the unloaded angle of links 16 with respect to housings 20 made such as to achieve this end.

Furthermore, a most important aspect of my invention lies in the relation between the lengths of links 16 and the distances between the upper and lower joint devices 12. In accordance with this invention, the lengths of the links 16 between the axial centers of the respective joint device core members should be substantially equal to or less than the distance between the axial centers of the core members of the joint devices on either side of the device 10.

In other words, the distance between points A and B in the device of FIGURE 1 should be substantially equal to or less than the distance between points A and D (or points B and C). However, the distance between points A and B will be substantially equal to the distance between points D and C.

Figure 3:
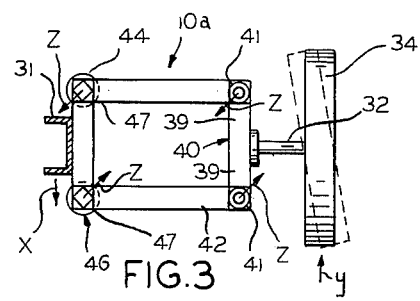
FIGURE 3 is a view similar to that of FIGURE 2, but depicting a prior art arrangement presenting some of the problems overcome by this invention.
Figure 2A:
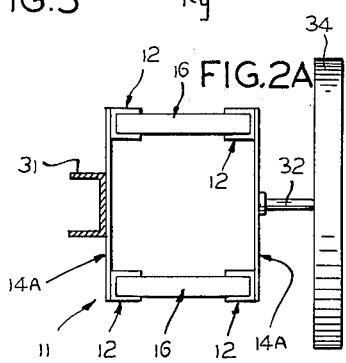
FIGURE 2A is similar to that of FIGURE 2, but illustrates a modified form of the suspension.

The importance of this relationship can best be explained by referring to FIGURES 2, 2A and 3. In the showing of FIGURE 2, one of the brace structures 14 is fixed to a vehicle frame member 31, while the other brace structure 14 has fixed thereto a stub shaft or spindle 32 having a wheel 34 journaled in any appropriate manner thereon and disposed in the desired vertical plane. For the purposes of explaining this invention, it may be assumed that the relation between the suspension device 10, the vehicle, and the wheel 34 is the same wherever a wheel is mounted on the vehicle, and this relation is depicted in diagrammatic FIGURE 4, wherein the devices 10 secure a plurality of wheels 34 to a trailer body 36 for purposes of equipping the trailer for movement along the roadway as a land vehicle.

As brought out by FIGURE 2, the basic length relationships above explained of the links 16 and the brace structures 14 is preserved. This is also true of the form 11 of FIGURE 2A, which is the same as FIGURE 2 except that brace structures 14A have a length that exceeds the length of the links 16.

In the showing of FIGURE 3, the suspension arrangement 10a shown includes the vehicle frame member 31, the stub shaft or spindle 32, and the wheel 34, but the suspension device is of the prior art type generally illustrated by Rohr Patent 2,861,796, but arranged in accordance with Boxan Patent 2,212,769, or Tellock Patent 2,571,784, whereby the spindle 32 is connected to a four arm bracket 40 (two upper and two lower arms 39), the arms 39 of which are pivotally connected as at 41 to the respective links 42 (which correspond to links 16) that are in turn connected to upper and lower elastic joint devices 44 and 46, which as disclosed by the Rohr patent are of the general type shown in said Neidhart patent; thus, the respective arms 42 in accordance with the Rohr patent are fixed with respect to the core members of the joint devices 44 and 46, respectively. The core members of the joint devices 44 and 46 are journaled in ball bearing units 47 fixedly secured to the vehicle frame, which is represented by frame member 31 in the showing of FIGURE 3.

Figure 4:
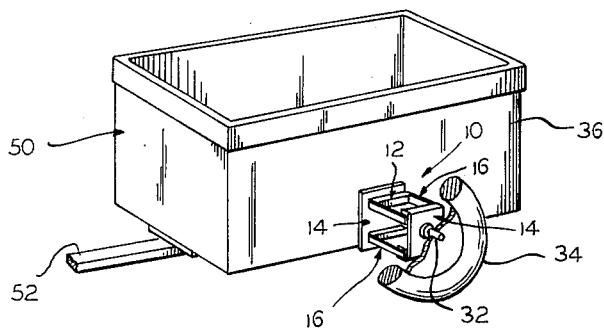
FIGURE 4 is a diagrammatic perspective view of a trailer vehicle having applied thereto the suspension device of this invention in a manner suggested by FIGURE 2.

It may be assumed for purposes of this description that FIGURE 3 represents the manner in which wheels 34 of FIGURE 3 would be applied to a vehicle of the type shown in FIGURE 4 to mount the vehicle for over the road service.

The forces acting on the vehicle and wheels in the showing of FIGURES 2 and 3 are depicted by the arrows X and Y, with the arrow X denoting the action of gravity while the arrow Y denotes the reaction to gravity on the individual wheels 34. It will be found that in connection with suspensions of the type shown in the above referred to Rohr, Boxan, and Tellock patents that the length of at least one of the links 42 exceeds the distance between the upper and lower pivot points on either side of these conventional suspension arrangements. Tests of these conventional arrangements will show that the vehicle wheel 34 departs from the desired vertically disposed position when any appreciable loads is applied to the trailer, as illustrated by the dashed line showing of FIGURE 3, due to an instability in the linkage which causes it to flatten out diagonally thereof, as indicated by the arrows Z of FIGURE 3.

However, when the length relationships above explained in connection with the suspension 10 are observed for both links 16, I have found that regardless of the load applied to the trailer, the wheels 34 will not depart from the desired vertically disposed position.

It is perhaps possible to explain why the suspension arrangement of FIGURE 3 does not hold the desired vertically disposed positioning of the wheel by working out the forces acting on suspension 10a. For instance, the action of gravity on the vehicle and the reactance against the respective wheels 34 undoubtedly applies forces to suspension 10a (in the directions indicated by the arrows Z) which tends to flatten out the generally parallel linkage illustrated. The inventor of the Rohr patent apparently sought to overcome this problem by journaling the core members of his elastic joints in bearings that were securely fixed to the vehicle frame, as this was probably thought to provide a secure bracing action on the otherwise laterally movable joint core members. The Boxan and Tellock patentees employed bearing structures for a similar purpose, but of the plain bearing type.

However, I have found that by observing the length relationships indicated in connection with the suspensions 10 and 11 for both links 16 and employing the parallel linkage indicated, with elastic joints of the type indicated at all pivot axes of the suspension, that ball or plain bearing brace structures of the type disclosed and required by the Rohr, Boxan and Tellock patents may be completely eliminated and yet have a wheel suspension unit which fully satisfies wheel vertical positioning requirements. One possible reason for this result is that when the lengths relationships of this invention are observed, the brace structures 14 (or 14A) have sufficient lengths, with respect to links 16, that the leverages they work through in handling the forces involved are adequate to resist without displacement the reactance movements applied to them by links 16.

Figure 5:
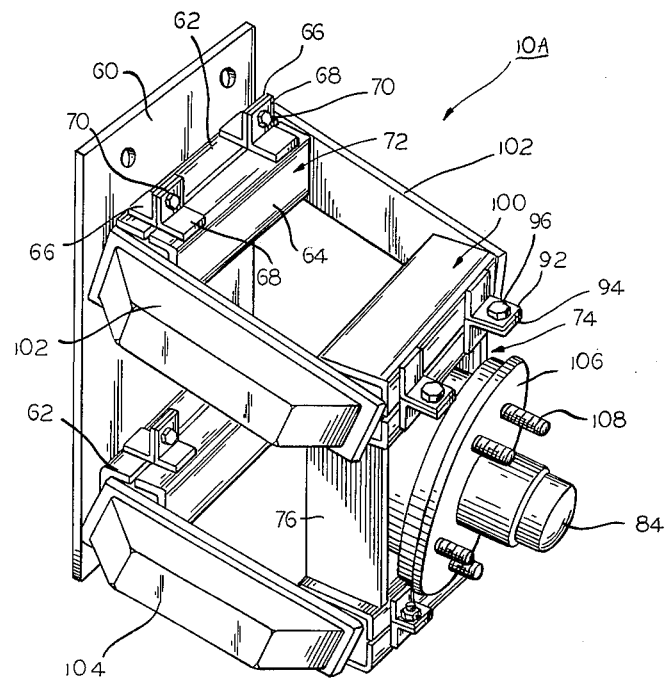
FIGURE 5 is a perspective view of a specific embodiment of the suspension arrangement of FIGURES 2 and 4.
Figure 6:
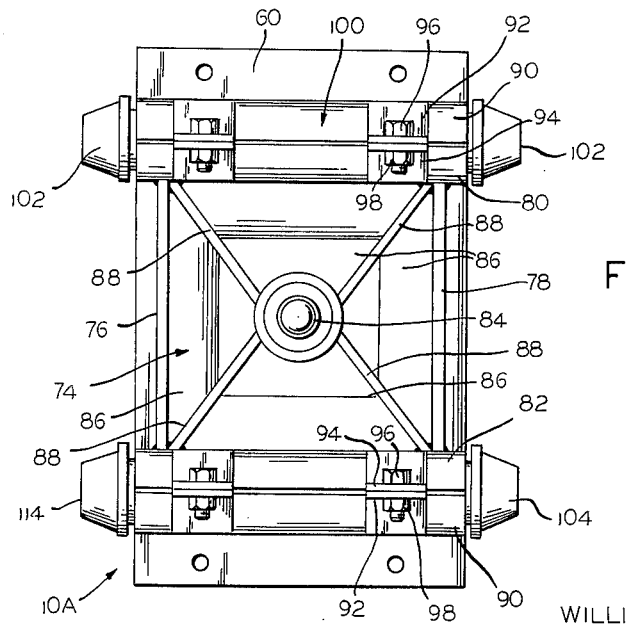
FIGURE 6 is an end view of the device shown in FIGURE 5, taken from the right hand side of FIGURE 5, but with the vehicle wheel mounting flange shown in FIGURE 5 omitted.

FIGURES 5 and 6 of the drawings show a specific form 10A of the suspension 10 as it is arranged in accordance with the showing of FIGURES 2 and 4.

FIGURES 7–12 show my basic suspension in a form 10B employed to mount a vehicle frame on conventional non-rotating trailer axles, and several variations of this arrangement are illustrated. The basic distance, parallel linkage, and elastic joint relationships pointed out above are observed in the application depicted by FIGURES 7–12, though in the instance of the latter figures, it is rotation of the through axle that is prevented, rather than preservation of vertical wheel positioning.

Figure 13:
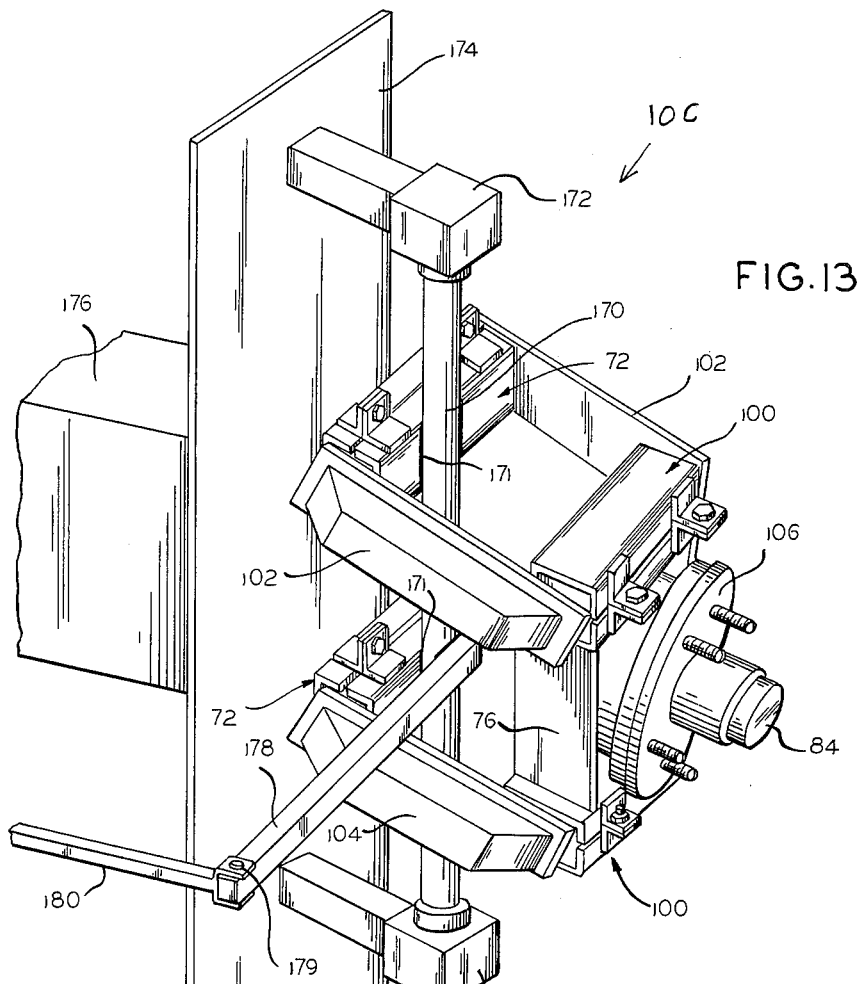
FIGURE 13 is similar to that of FIGURE 5, but illustrates a turning wheel suspension arrangement employing the form of the invention shown in FIGURE 5.
Figure 14:
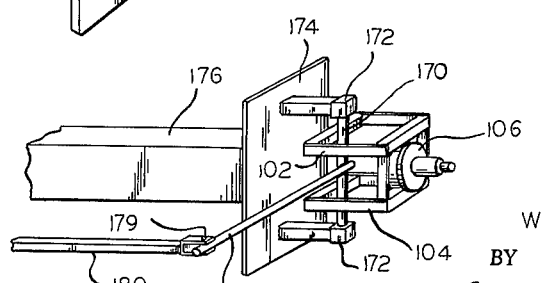
FIGURE 14 is a fragmental diagrammatic perspective view illustrating the suspension device of FIGURE 13 applied to a through axle of a type shown in FIGURE 7.

The showing of FIGURES 13 and 14 illustrates the wheel suspension arrangement of FIGURE 2 mounted to provide a turning wheel arrangement 10C.

*Specific description*

The vehicle suspension arrangement of FIGURES 2 and 4 may take the specific form 10A illustrated in FIGURES 5 and 6 and in accordance with this embodiment of the invention, the suspensions 10 (or 10A) are fixed directly to the sides of box-like container 50 (see FIGURE 4), adjacent the midportion thereof to form a simplified two wheel trailer 36. It is assumed that the trailer 36 may be towed by a suitable tongue structure 52. It should be immediately apparent that suspension 11 could be used instead of suspensions 10 or 10A, and that four of these units could be used to form a four wheel trailer.

The suspensions in the form 10A shown in FIGURES 5 and 6 comprise a plate 60 that forms the brace structure which is fixed to the container 50 as by bolts, rivets, welding, etc. Fixed to the plate 60 in spaced relation in accordance with the above mentioned relationship are a pair of channel members 62, as by welding, to which are bolted mating channel members 64 that complete housings 72 equivalent to the housings indicated at 20 in FIGURE 1. For this purpose, suitable lugs 66 and 68 may be welded to the respective channel members, and on either side thereof, and such lugs secured together by appropriate bolts 70.

Mounted inside the housings 72 defined by the respective pairs of channel members 62 and 64 are core members equivalent to core members 22 of FIGURE 1 and resiliently elastic rods or rod-like members (not shown) equivalent to those indicated at 30 in FIGURE 1.

The opposing brace structure 74 of the specific suspension 10A shown in FIGURES 5 and 6 comprises a fabricated arrangement made up of plates 76 and 78 fixed, as by welding, to upper and lower channel members 80 and 82. A wheel journaling spindle 84 is made fast to the brace structures 74 by fixedly associating same with webs 86 and strengthening flanges 88 that are all rigidly united to the plates 76 and 78 as well as channel-shaped members 80 and 82, as by welding.

The respective channel-shaped members 80 and 82 each have secured thereto a channel-shaped member 90 to provide a housing structure equivalent to housing 20 of FIGURE 1. The respective channel members are provided with lugs 92 and 94 together with cooperating bolts 96 and nuts 98 for this purpose. As in the case of the housings 72, the resulting housings 100 each contain a core member equivalent to core member 22 of FIGURE 1 and a plurality of rod-like members equivalent to members 30 of FIGURE 1.

In the form of FIGURES 5 and 6, the core members of the upper housings 72 and 100 are fixed together by reinforced bars 102 while the lower housings 72 and 100 have their core members fixed together by reinforced bars 104.

Journaled on the spindle 84 in a conventional manner is a conventional wheel mounting flange 106 (see FIGURE 5) provided with the usual bolts 108 for fixing a conventional wheel structure (not shown) to the mounting flange 106 and thus journaling it on the spindle 84.

The suspension 10A form as shown in FIGURE 5 illustrates the suspension as it appears when mounted on the trailer before a wheel is applied to mounting flange 106. Under such circumstances, the trailer body would presumably be supported on jacks or the like and gravity acting on brace structure 74 gives the suspension 10A the downwardly inclined appearance of FIGURE 5, though even in the position shown, it is clear that mounting flange 105 is vertically disposed. However, it may be found that in designing specific embodiments of this invention, some compensating factors may have to be introduced to insure that the wheel will be vertically disposed when under reasonable static loads, since while the length relationships of this invention provide for full stability of the suspension, the variable stress that will be acting on joint devices 12 between loaded and no load conditions may tend to introduce a tilting action on the wheel. This may be overcome by mounting either the suspension or the spindle so that in the no load condition they tilt in a downward direction from the technical horizontal level; also, the lower links of the suspension may be made slightly shorter than the upper links to achieve this tilting action, or the rod members 30 of devices 12 may be selected as to hardness, lengths, or diameter to displace the pivot axis of links 16 as may be necessary to achieve the same affect.

However, these variations from the basic linkage disclosed will be the full equivalents of the structure herein disclosed, and the terminology of the appended claim is to be construed to cover them.

In the form of FIGURES 7, 8 and 9, the basic suspension group 10 is employed in the form 10B to mount a trailer vehicle body on conventional non-rotating through axles 120 to provide a trailer arrangement 122.

In the showing of FIGURE 7, only the front end of the trailer is illustrated and the trailer body is intended to be represented by framing 124, it being understood that any type of trailer body may be fixed to framing 124 to complete the trailer.

The axle structure 120 has mounted in a conventional manner at each end thereof turning front wheels 126 mounted to pivot about pins 128 under the guiding action of steering rods 130 that are connected between the trailer pull tongue 132 and the respective wheel spindle structures 135. The tongue 132 is connected to the axle 120 in any convenient manner and the steering rods 130 are pivotally connected as at 136 and 138 to the tongue and spindle structures respectively to perform their customary and usual functions in this art to turn or swing wheels 126 when it is desired to provide the steering action on trailer 122.

In accordance with this embodiment of the invention, one of the brace structures of the basic suspension unit 10 takes the form of angle member 140 that is fixed to two of the elastic joint housings 20, as by welding, and which is also secured in any suitable manner to the framing 124. At the other side of the suspension, the brace structure takes the form of a plate 142 welded between the upper and lower housings 20 at this side of the suspension, and the lower housing 20 is fixed, as by welding to a mounting plate 144 which in turn is fixed to axle 120 in any suitable manner, as by appropriate bolts 146 applied between the plate 144 and a like plate 148 underneath the axle 120.

In the embodiment of FIGURES 7-9, a pair of the suspension devices 10B are applied in a similar manner at each end of the vehicle, as suggested by FIGURE 7, which like reference numerals indicating like parts, though preferably links 16 are in the form of T section arm members 147 for reinforcing purposes. The remainder of the linkage is substantially the same as that illustrated in FIGURES 1, 2 and 4, as indicated by the identical reference numerals employed.

The T-section of arm members 147 provides reinforcement against horizontal and vertical bending of links 16, but permits adequate twisting of these links 16 to insure adequate tilting of axle 120 with respect to the framing 124 to accommodate bumps that affect one wheel but not the other. It will be noted that links 16 of suspension devices 10B are applied to only one end of the respective joint devices 12 that make up same, and this avoids interference with the twisting of links 16 that is contemplated by this form of the invention.

The rear end of trailer 122 has similar suspension devices 10B applied to it in a similar manner, and as a matter of fact, FIGURE 8 may be considered to represent a showing of the rear axle arrangement. However, the links 16 of the forward and rearward devices 10 could either extend in the same direction or in opposite directions for purposes of absorbing shocks. And the prestressing of joints 12 is preferably such that under normal load conditions for any particular trailer arrangement, links 16 will be substantially horizontal.

In the form of FIGURES 10 and 11, the suspension unit $10B_1$ is arranged so that the joint housings 20 are disposed out from between the body frame 124 and the trailer axles and thus outside the body frame 124. This involves mounting the brace structures 140a corresponding to plates 140 at the other ends of the housings 20, as compared to the showing of FIGURE 7, and when this is done, the trailer body may be disposed at a somewhat lower elevation with respect to the ground, thereby lowering its center of gravity. In the showing of FIGURES 10 and 11, the basic suspension structure indicated at one side thereof is fixed to a diagrammatically illustrated axle 120a similar to the manner shown in FIGURE 7. Brace plate 140a is provided with a ledge or flange 150 to which the frame 124 is fixed in any suitable manner.

In the embodiment 10B$_2$ of FIGURE 12, the general arrangement is the same as that shown in FIGURE 7 except that the core members of the devices 12 on each side of the vehicle extend across the vehicle in the form of continuous polygonal members 160. This arrangement increases the lateral stability of the trailer.

In the embodiment 10C of FIGURES 13 and 14, the specific form of suspension shown in FIGURES 5 and 6 is employed, except that the plate 60 is eliminated and instead a brace or bracket structure in the form of a shaft or spindle 170 is fixed between the elastic joint housings 72, as by welding at 171. The upper and lower ends of the shaft or spindle 170 are journaled for swinging movement about a vertical axis in thrust bearing structures 172 of any appropriate type that are fixedly connected to plate structure 174 which is in turn secured to the ends of a trailer wheel axle, such as an axle 176 that is equivalent to axle 120 of FIGURE 7.

Fixed to the shaft or spindle 170 at a convenient point therealong and extending outwardly thereof is a lever arm 178 of any appropriate type which is pivotally connected as at 179, in any suitable manner, to a steering rod 180 comparable to the rods 130 of FIGURE 7, which rod 180 is connected to a trailer tongue in the manner suggested by FIGURE 7 for the purposes of turning shaft or spindle 170 about its longitudinal axis.

When the suspension arrangement of FIGURE 13 is applied in the manner indicated to both ends of an axle 176, a turning action on the trailer may be obtained by turning the conventional tongue in the manner to swing the suspension of FIGURE 13 in the direction required to turn the vehicle in the desired direction. Of course, an appropriate wheel would be applied to the mounting flanges 106 of this embodiment of the invention. The remaining details of this form of the invention are the same as those described in connection with FIGURES 5 and 6, as indicated by the corresponding reference numerals.

It will therefore be seen that my basic suspension unit provides significant advantages in the art of suspending vehicles. When employed in the forms of FIGURES 2, 2A, 4–6 and 13, the problem of wheels going out of or departing from the desired vertical position is completely eliminated without requiring the use of expensive bearing or journaling arrangements. When employing the arrangements of FIGURES 7–11, a simplified trailer suspension arrangement is provided which is adaptable for heavy suspensions such as in the case of trailers used for commercial cargos.

Moreover, the basic suspension unit makes available for vehicle suspension arrangements the above indicated advantages of the type of resiliently elastic joint disclosed in the above referred to Neidhart patent. The desired spring action is achieved without using lubrication requiring joints or expensive machined parts.

The embodiments of FIGURES 2, 2A, 4–6 and 13 are of particular significance since they may be employed to suspend vehicle bodies without requiring axle structures, and the vehicle bodies may be mounted at any desired distance above the ground level.

The foregoing description and the drawings are given merely to explain and illustrate my invention and the invention is not to be limited thereto, except insofar as the appended claim is so limited, since those skilled in the art who have my disclosure before them will be able to make modifications and variations therein without departing from the scope of the invention.

I claim:

A resilient suspension device for vehicle turning wheels, said device comprising:

a spindle member and a bracket member disposed in substantially parallel relation, means for securing said spindle member to the vehicle for pivotal movement about a substantially vertical axis, said bracket member including means for securing a wheel structure thereto, a parallel linkage extending between said spindle member and bracket member and including a pair of spaced parallel links, said links adjacent either end thereof each being fixed to a polygonal core member, said spindle member and said bracket member each having fixed thereto a pair of polygonal tubular housing members in which the respective core members are pivotally received, said polygonal members all having the same number of sides and being positioned with respect to each other in the unloaded condition of said suspension device such that the apexes of said core members are positioned adjacent the respective inner faces of the respective housing members, said tubular housing members and said core members respectively defining pockets equal in number to the number of sides of said polygonal members, and an elongate resilient rod received in each of said pockets, said links both having a length no greater than approximately the distance between the pivotal axes of said core members of the respective bracket members, and a steering lever fixed to said spindle member.

References Cited by the Examiner

UNITED STATES PATENTS

| | | | |
|---|---|---|---|
| 1,919,033 | 7/33 | Noble | 267—57.1 |
| 2,142,872 | 1/39 | Haushalter | 267—57.1 |
| 2,670,966 | 3/54 | Haller | 280—96.2 X |
| 2,712,742 | 7/55 | Neidhart | 267—21 X |

FOREIGN PATENTS

| | | |
|---|---|---|
| 714,984 | 9/54 | Great Britain. |
| 1,019,504 | 10/52 | France. |
| 1,072,325 | 3/54 | France. |
| 1,215,311 | 11/59 | France. |

OTHER REFERENCES

Kassbohrer, German application, 1,013,533, printed Aug. 8, 1957.

ARTHUR L. LA POINT, *Primary Examiner.*

ROBERT C. RIORDON, *Examiner.*